(12) United States Patent
Hughes

(10) Patent No.: US 6,295,134 B1
(45) Date of Patent: *Sep. 25, 2001

(54) PARALLEL REDUNDANT INTERPRETATION IN A RASTER IMAGE PROCESSOR

(75) Inventor: Macduff R. Hughes, Oakland, CA (US)

(73) Assignee: Adobe Systems Incorporated, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/932,678

(22) Filed: Sep. 18, 1997

(51) Int. Cl.$^7$ ...................................................... G06F 15/00
(52) U.S. Cl. ......................................... 358/1.13; 358/1.14
(58) Field of Search ..................................... 395/114, 101, 395/107, 108, 110, 111, 112, 113, 115, 117, 116, 103; 358/1.15, 1.14, 1.16, 1.13

(56) References Cited

U.S. PATENT DOCUMENTS

| 5,825,991 | * | 10/1998 | Plakosh et al. | 395/115 |
| 5,870,766 | * | 2/1999 | Shively | 707/500 |
| 5,878,199 | * | 3/1999 | Soker et al. | 395/117 |

\* cited by examiner

*Primary Examiner*—Jerome Grant, II
*Assistant Examiner*—Douglas Tran
(74) *Attorney, Agent, or Firm*—Fish & Richardson P.C.

(57) ABSTRACT

A method and apparatus for interpreting a page description language file defining a sheet to be printed on a printing device. The method including processing in parallel the page description language file by a plurality of redundant interpreters. The output of one of the plurality of redundant interpreters is enabled for each page of the sheet such that one interpreter of the plurality of redundant interpreters produces an output for each page of the sheet.

6 Claims, 5 Drawing Sheets

TABLE 1:

| POSTSCRIPT PROGRAM | RECORDER CALLS |
|---|---|
| % THIS PROGRAM DRAWS A | |
| % LARGE GRAY TRIANGLE | |
| NEWPATH | |
| 100 100 MOVETO | |
| 400 200 LINETO | |
| 100 400 LINETO | |
| CLOSEPATH | |
| 0.5 SETGRAY | |
| FILL | |
| | FILL |
| | PS2CURRENTCOLOR |
| | PS2CURRENTPATH |
| SHOWPAGE | |
| | SHOWPAGE |

FIG. 4

PARALLEL REDUNDANT INTERPRETATION IN A RASTER IMAGE PROCESSOR

BACKGROUND OF THE INVENTION

The present invention relates generally to methods and systems for printing computer generated images and more particularly to methods and apparatus for formatting a sheet in preparation for printing on a printing device.

A computer system can output data to a wide variety of output display devices. Output display devices such as laser printers, plotters, imagesetters, and other printing devices produce an image or "visual representation" on a sheet of paper or the like. A printing device can print dots on a piece of paper corresponding to the information of a bitmap (or pixelmap having a depth of two or more bits). A "raster" printing device creates a visual representation by printing an array of pixels arranged in rows and columns from the bitmap.

One type of printing device that can receive data from a computer system is a printing press. A printing press may be used to produce books, newspapers, pamphlets, posters and other single and multi-page printed matter. A printing press may print multiple pages of printed matter at the same time onto a single sheet. Other devices used for printing multiple pages at the same time include imagesetters and plate setters.

When printing multiple pages, the individual pages are arranged in one or more sheets. Each sheet includes a layout of pages that may be ordered or otherwise optimized to facilitate post-printing processes. For example, the layout of the sheet may be arranged such that individual pages are in sequence when folding occurs.

Printing devices that produce output in response to page description language input are widely used. A page description language (PDL) is a high level language for describing objects to be displayed by an output device, such as PostScript® language available from Adobe Systems Incorporated of San Jose, Calif. A printing device may receive page description data for an entire sheet in the form of a PDL file. In order to produce a finished sheet, the printing device interprets the data contained in the PDL file, renders objects within the data into bitmaps, and after all objects for the sheet are rendered, prints the sheet.

Interpretation is a pre-printing process that includes the sub-functions of language interpretation and output production. Language interpretation may result in the conversion of the data from one format to another and the manipulation of data in a local memory in order to produce a final output. Output production may include the generation of a new PDL file (such as a PDL page file) or raster data.

An interpreter may be used to convert data for a sheet from its associated page description language file format into individual page description page files, one for each output page in the PDL file processed. Conventional interpreters operate on pages of a PDL file in order. That is, the interpreter produces as an output a PDL page file for each page in the sheet in the order that the pages are to be printed for the given sheet.

Imposition is the pre-printing process of arranging the pages for a sheet to achieve a proper sequence or position of each page relative to other pages. Imposition is performed to facilitate post-printing processes. These processes include fold and cut operations followed by some form of binding. Conventional imposition processes are executed on a computer workstation prior to the printing process. An imposition process operates on one or more PDL page files, for example as produced by a interpreter, and layout information for a given sheet. The layout information describes how the pages are to be arranged to achieve the desired output result. The output of an imposition process is generally a single PDL file that includes all the data required (including external references if any) to print the sheet by a printing device.

SUMMARY

In general, in one aspect, the invention features a method of interpreting a PDL file prior to printing by a printing device. The method includes receiving a page description file defining at least two pages to be printed on a surface of a media sheet. The page description file is transferred to a first interpreter and a second interpreter. Both the first and second interpreters process all interpretation language operators within the page description file. The first interpreter is enabled to produce a first output page description file defining a first one of the pages to be printed on the surface of the media sheet while the second interpreter is disabled from producing the first output page description file. The second interpreter is enabled to produce a second output page description file defining a second one of the pages to be printed on the surface of the media sheet while the first interpreter is disabled from producing the second output page description file.

Certain embodiments of the invention include one or more of the following features. The page description file is a PostScript file. The output page description files are PDF files. The printing device is selected from the group of an imagesetter, a digital press, a printing press and a plate setter.

In another aspect, the invention features a method of interpreting a page description language file defining a sheet to be printed on a printing device including processing in parallel the page description language file by a plurality of redundant interpreters. The output of only one of the plurality of redundant interpreters is enabled for each page of the sheet such that only one interpreter of the plurality of redundant interpreters produces an output for each page of the sheet. The output may be display list data.

In another aspect, the invention features a computer program, residing on a computer-readable medium, comprising instructions for causing the computer to receive a page description language file defining a sheet to be printed on a printer, interpret in parallel the page description language file by a plurality of redundant interpreters and enable the output of only one of the plurality of redundant interpreters for each page of the sheet such that only one interpreter of the plurality of redundant interpreters produces an output for each page of the sheet. The sheet may include two or more pages.

In another aspect, the invention features an apparatus for interpreting a page description language file defining a sheet to be printed on a printing device. The sheet includes a plurality of pages. The apparatus includes a plurality of interpreters each configured to receive the page description language file and output a page description file for each page of the sheet and a controller. The controller operates to enable one of the plurality of interpreters for each page, such that any one interpreter of the plurality of interpreters produces an output for a subset of all the pages of the sheet.

In another aspect, the invention features a printing device for printing a sheet including a plurality of pages, the printing device including a plurality of redundant interpreters each configured to receive a page description language file describing the sheet and output a page description file for each page of the sheet. The printing device also includes a controller operating to enable one of the plurality of interpreters to produce an output for each page and a plurality of redundant raster image processors each configured to receive a page description file from one of the plurality of redundant interpreters and produce pixelmap data. A print engine is included for receiving the pixelmap data and producing an image of the sheet on an image media.

The controller may enable ones of the plurality of interpreters according to a predefined algorithm. The predefined algorithm may be a round robin modulo algorithm. The predefined algorithm may select an interpreter for enabling based on performance characteristics for a given interpreter. A performance characteristic may be a speed at which a particular interpreter processes output files or may relate to a type of page received. A particular interpreter is enabled based on availability or type when a page having the certain type is received for processing. The controller may enable one interpreter for output of even pages and a second interpreter for producing output for odd pages of the sheet. The interpreters may be executed on different speed processors.

In another aspect, the invention features a method of printing a sheet by a printing device, the sheet including one or more pages of content defined a page description file, the method including receiving a page description file defining one or more pages for display on the sheet. Data from the page description files is interpreted in parallel in a plurality of redundant interpreters Display data for each page in the sheet is generated by only one of the redundant plurality of interpreters. The display data is rendered to create pixelmaps. The pixelmaps may be printed on the sheet.

Among the advantages of the invention are one or more of the following: A PDL file describing a sheet to be printed by a printing device may be parsed and operated on simultaneously by more than one interpreter each producing a subset of the PDL page files required to produce the sheet on the printing device. The outputs from the parallel interpreters may be provided to parallel raster image processors for producing raster data faster for consumption by a print engine in the printing device.

Other features and advantages of the invention will become apparent from the following description and from the claims.

BRIEF DESCRIPTION OF THE DRAWINGS

FIG. 4 is a table including a sample PostScript file and corresponding recorder calls implemented by a interpreter according to the invention.

DETAILED DESCRIPTION

The present invention may be embodied in output devices that receive page description data and produce from the data visual output, for example on a piece of paper. An output device may include a prepress routine for implementing layout functions, a raster image processor for producing pixelmaps (or bitmaps depending on the depth of the resultant data) from received data and one or more engines for producing images on varied output media. The invention has particular applicability to printing presses, imagesetters, plate setters, digital presses and the like and will be described in terms of an embodiment in such a device, which will be referred to simply as a digital press.

Figure 1:
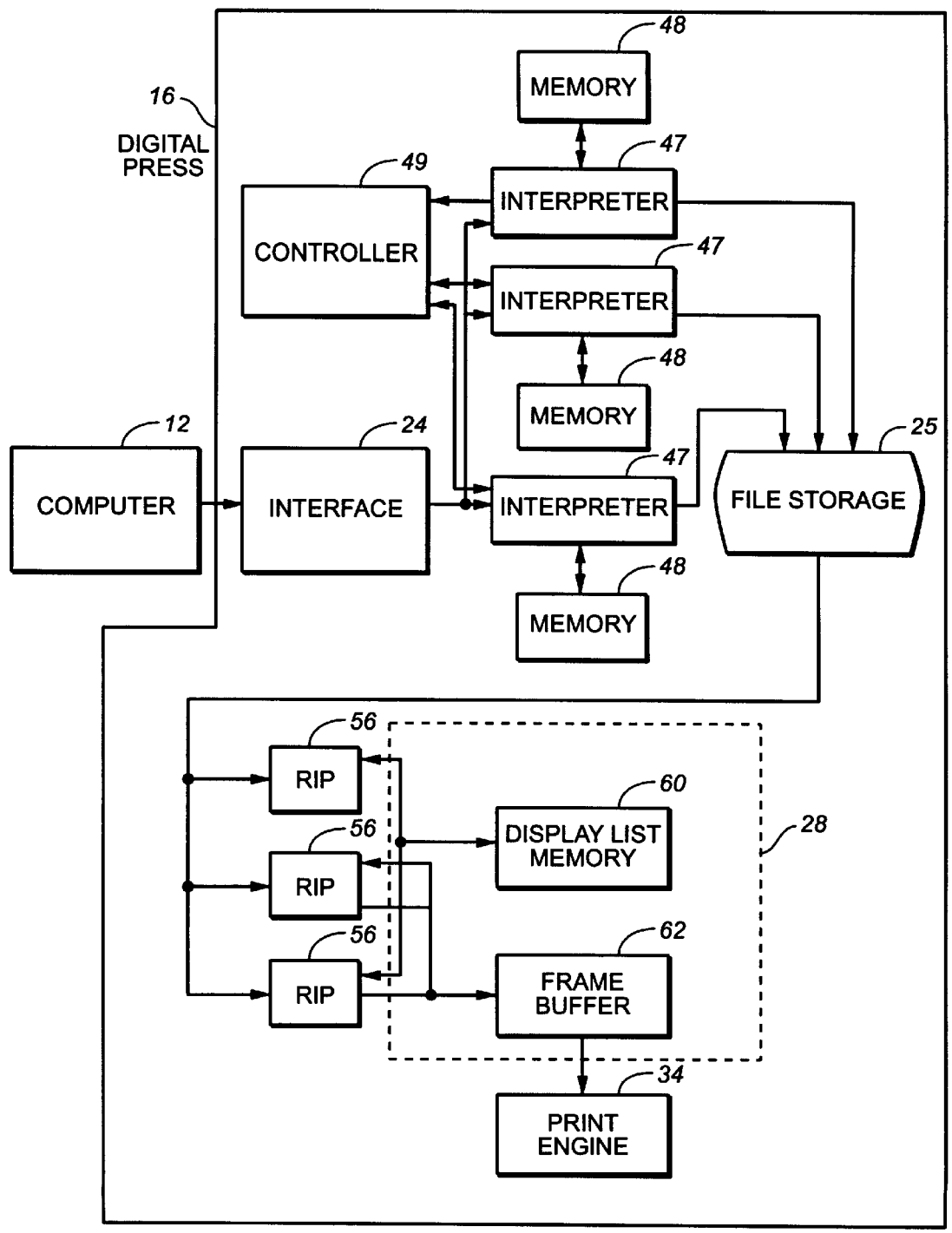
FIG. 1 is a block diagram of a printer according to the invention.

Referring to FIG. 1, a digital press 16 receives input data files, from a computer 12, for example, and turns the input data files into marks on a piece of paper by sending signals to a print engine 34. Digital press 16 is configured to receive page description language input data files and layout information from one or more users and process it as will be described later. One suitable page description language is the Portable Document Format file format available from Adobe Systems Incorporated of San Jose, Calif. Another suitable page description language is the PostScript language available from Adobe Systems Incorporated of San Jose, Calif. The Postscript language is described in Adobe Systems Incorporated, Adobe PostScript Language Reference Manual, Addison-Wesley (2d ed., ©1990). Another suitable page description language is the PCL language available from Hewlett-Packard Company of Palo Alto, Calif. Another page description language is CT and LW available from Scitex America, Inc., of Bedford Mass. A page description language file sent to an digital press specifies objects to be displayed and related information. A PostScript object can, for example, include a pixelmap defining a pattern of pixels to be displayed, or it can reference an outline curve defining in mathematical terms a shape to be marked. The object may also include other rasterizing information such as font and size.

The digital press 16 includes (which includes interpreters 47, controller 49, and raster image processors 56) an interface 24, file storage 25, a digital data processor which includes interpreters 47, controller 49 and raster image processors 56, random access memory 28, and print engine 34. It also includes read-only memory, I/O interfaces, and data transfer paths and busses, none of which are shown, for storing and transferring data in support of the functions described below.

Interface 24 regulates the flow of information between digital press 16 and computer 12 according to a standard communication protocol. Alternatively, interface 24 may support a file transfer protocol for sharing files between computers in networks on a intranet or internet. Interface 24 may include a buffer for buffering data received from computer 12 in the event digital press 16 is not ready to process or otherwise unable to manipulate the received data. The buffer may use file storage 25.

File storage 25 is a mass storage device such as hard disk or disk array for storing files received from computer 12 and generated by digital press 16 in producing a final output. Each file includes one or more objects associated with a given sheet to be output by the digital press. Digital press 16 may store all the files associated with a particular sheet in file storage 25 prior to rendering data objects associated with a given file.

The processor may be a general or special purpose microprocessor operating under control of computer program instructions executed from a memory. In the embodiment illustrated in FIG. 1, the processor includes a number of special purpose sub-processors including one or more instances of an interpreter 47, controller 49 and one or more instances of a raster image processor (RIP) 56. Each sub-processor may be a separate circuit able to operate substantially in parallel with the other sub-processors. Some or all of the sub-processors may be implemented as computer program processes (software) tangibly stored in a memory to perform their respective functions. These may share an instruction processor, such as a general purpose integrated circuit microprocessor, or each sub-processor may have its own microprocessor for executing instructions. Alternatively, some or all of the sub-processors may be implemented in an ASIC (application specific integrated circuit). In addition, the sub-processors may be distributed or may form a part of computer 12. For example, interpreters 47 and controller 49 may reside in computer 12, external to the printing device. In this configuration, the individual PDL page files output by instances of interpreter 47 are received from computer 12 for processing by RIPs 56 in the printing device.

Each instance of an interpreter 47 is identical. The instances of interpreter 47 and controller 49 process PDL files received from computer 12 and generate PDL page files for storage in file storage 25. Associated with each instance of interpreter 47 is a memory element 48. Memory 48 may be a virtual memory and may be embodied in RAM 28.

Figure 2:
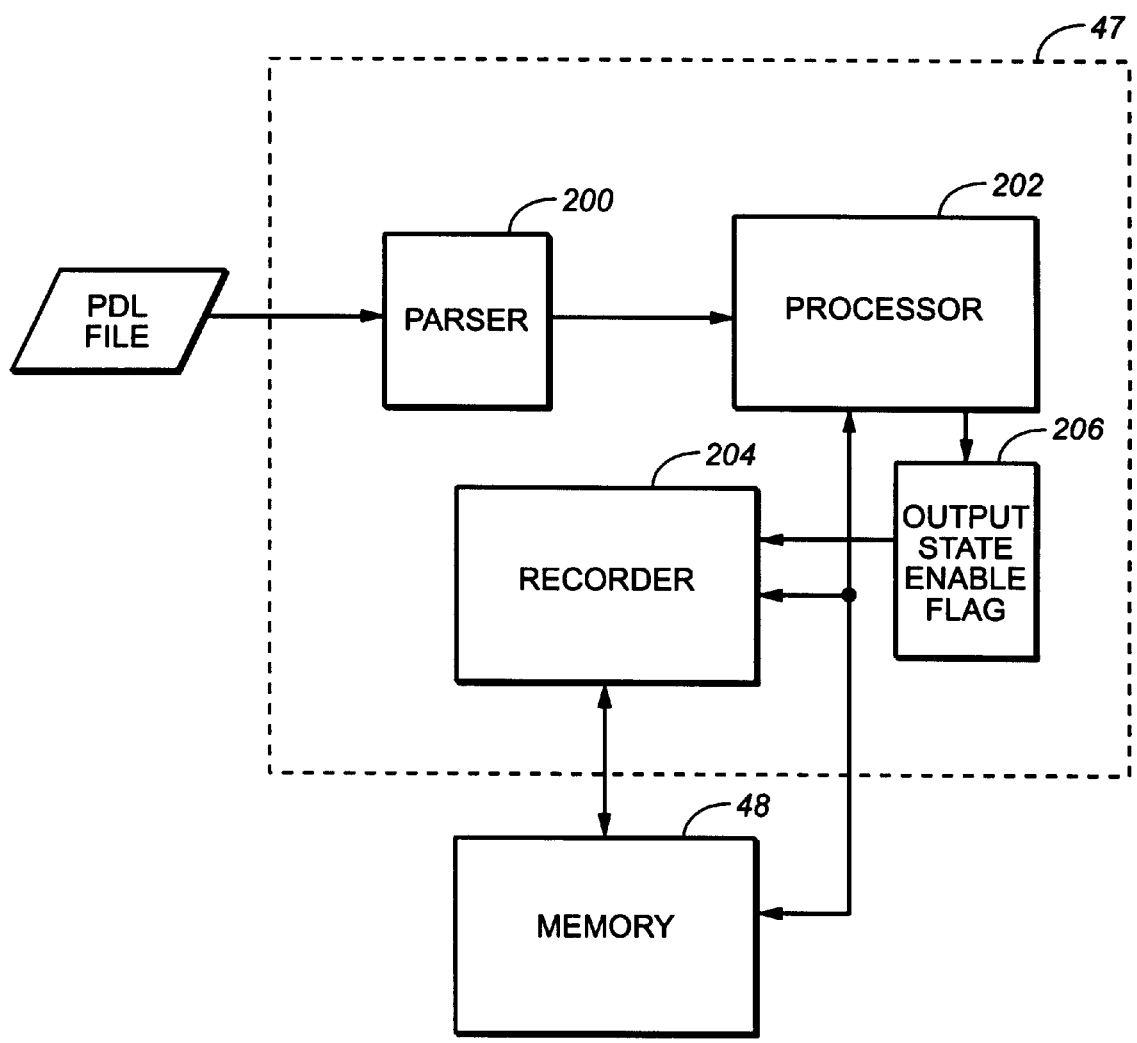
FIG. 2 is a detailed block diagram of parallel interpreters according to the invention.

Referring now to FIG. 2, each instance of interpreter 47 includes a parser 200, a processor 202 and a recorder 204. Parser 200 operates on the incoming PDL file to break the input data into tokens and passes the tokens to processor 202. Processor 202 operates on the tokens received. Recorder 204 processes function calls identified by the processor and retrieves data from memory element 48 for processing. The operation of the parser 200, processor 202 and recorder 204 will be described in greater detail below in reference to FIG. 3b.

Each instance of interpreter 47 receives as an input a PDL file (500) and generates as an output one or more of the PDL page files required to print a sheet in accordance with the input PDL file data 510. Controller 49 selectively enables one of the interpreters 47 to output a PDL page file for each page in the input PDL file (505). The operation of the instances of interpreter 47, memory element 48 and controller 49 will be described in greater detail below in reference to FIGS. 3a and 3b.

Each instance of RIP 56 renders object data received from an instance of interpreter 47 (or stored in memory, RAM 28) and produces pixelmaps for storage in RAM 28. A RIP may include interpretation processes as well as imposition processes.

In one embodiment, the output from each instance of interpreter 47 is a PDF file. Upon receipt, RIP 56 interprets the PDF file and stores the interpreted data in lists (display lists) sorted by band. The display lists may be resident in RAM 28 (for example in display list memory 60) or on disk. The RIP processes the display list data producing pixelmap data. The pixelmap data may be stored in a frame buffer 62 in memory (RAM 28) until time for transfer to print engine 34.

Alternatively, the output from each instance of interpreter 47 may be display list object data describing an associated page. The display list data may be stored in RAM 28 until operated on by a RIP 56.

After all of the objects associated with a given sheet (surface) have been processed by an instance of RIP 56, the pixelmap data stored in frame buffer 62 may be applied to the media by printing engine 34.

RAM 28 is a random access memory used by the processor (sub-processors 47, 49, 56). RAM 28 may include display list memory 60 (for storing display list data generated by RIPs 56) and a frame buffer 62. Display list memory 60 is used to store one or more lists, one for each band designated for a particular media image. Each list stores objects or portions of objects representative of data to be displayed in a particular band of an output image.

Pixelmaps produced by instances of RIP 56 may be compressed prior to storage in frame buffer 62. Accordingly, RAM 28 may also include an uncompressed band buffer memory (not shown) for storing uncompressed pixelmaps drawn by instances of RIP 56 and frame buffer 62 may store compressed pixelmaps.

RAM 28 may be embodied in one or more memory devices. If display list memory 60 and the frame buffer 62 are consolidated physically into a single memory device(a consolidated memory), then the memory may be partitioned or otherwise mapped to reflect the boundaries of the various memory sub-components.

Data flow, rather than physical interconnection, is illustrated between elements of digital press 16. Processor and memory components are physically interconnected using a conventional bus architecture.

The digital press components that have been described can be packaged in a single product; alternatively, some can be included in computer 12 or otherwise housed separately.

Figure 3:
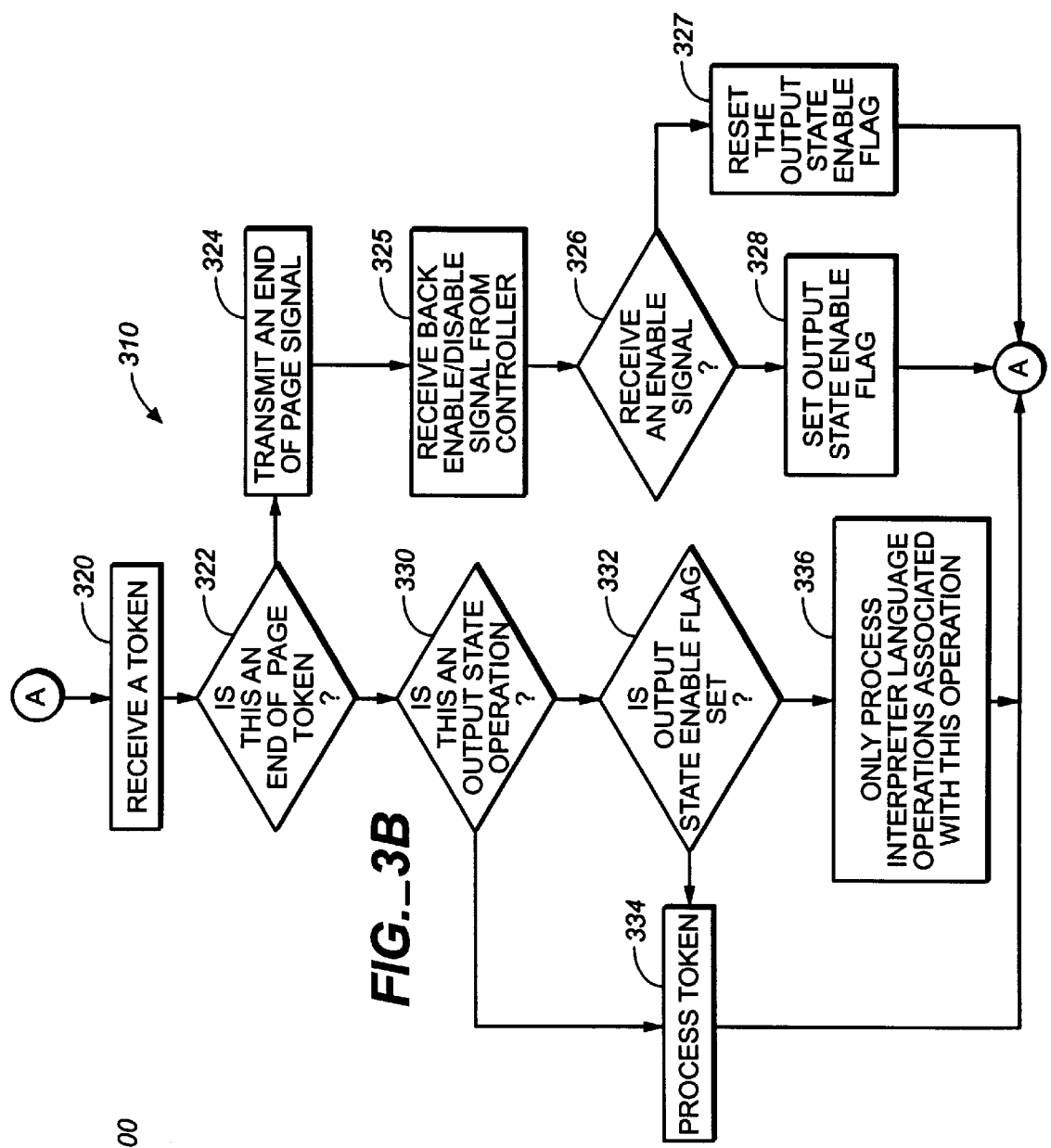
FIG. 3a is flow chart for an interpretation process for a raster output device including parallel interpretation according to the invention.
FIG. 3b is a detailed flow diagram for parallel processing of tokens by parallel interpreters according to the invention.
Figure 5:
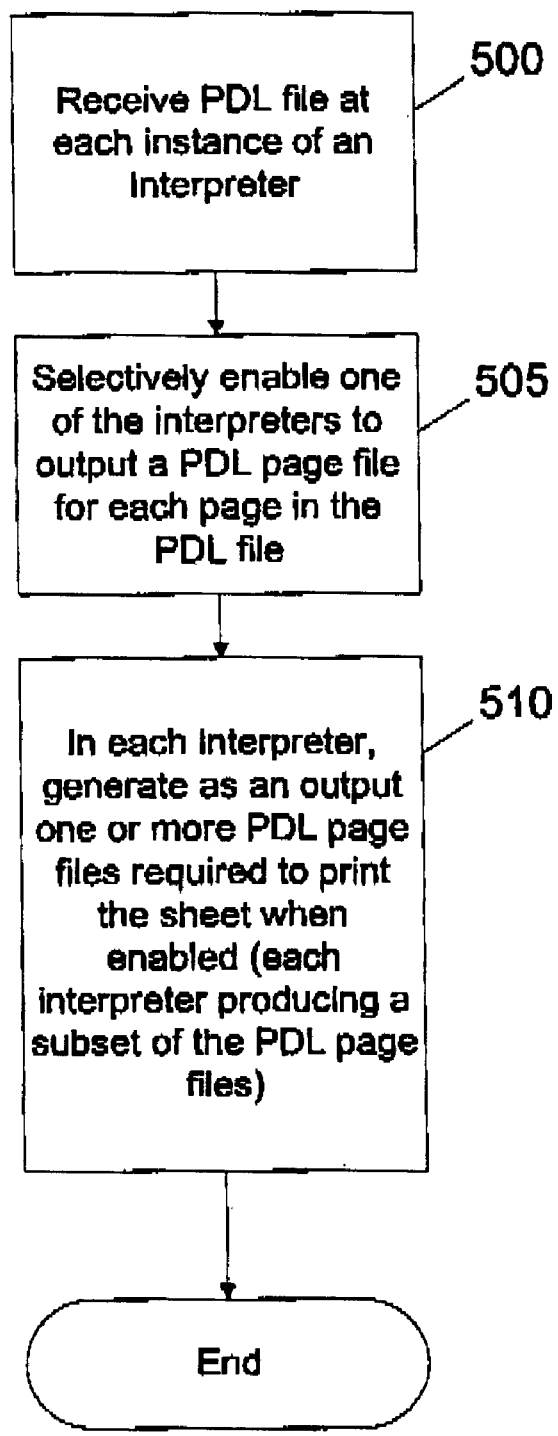
FIG. 5 is a flow chart of a process for interpreting a PDL file.

Referring now to FIGS. 2 and 3a, a conventional rendering and marking process for a raster output device is enhanced by the addition of a method of interpretation 300 prior to the RIP process. Digital press 16 receives a PDL file from computer 12 representative of a sheet to be displayed (302). The file is transferred to each instance of interpreter 47 (304).

When a file is received by an interpreter 47, parser 200 parses the input data objects into tokens (306). A token may be a name, a number, a procedure or a call for invoking a plurality of procedures or an operator. The interpreter is initialized (308) and thereafter each token may be processed (310). During the initialization process, controller 49 initializes each instance of interpreter 47, setting an output state enable flag 206 (FIG. 2) in each. Output state enable flag 206 determines which of the instances of interpreter 47 is to produce an output PDL page file for a given page of the sheet. The default state for output state enable flag 206 for an instance of interpreter 47 may be the disable state, and accordingly, the controller may only be required to set the state of one instance of interpreter 47 (to the enable state) to complete the initialization process. The algorithm used to determine which instance of interpreter 47 is enabled is discussed in greater detail below in reference to FIG. 3b.

A token defines a processor operation and may include stack manipulation, variable definition, resource installation or a function call. Accordingly, each instance of interpreter 47 may be required to access an associated memory element 48 to store and update information required to produce an output file. For example, a PostScript ADD operator requires stack manipulation, namely the replacement of the top two elements of the stack with their sum.

Tokens can be classified as of two types: interpreter environment tokens and output tokens. Tokens that only effect the environment of the interpreter including its associated stacks, virtual memory, standard input and output files and graphics state are referred to as interpreter environment tokens. Examples of interpreter environment tokens for PostScript input files include the ADD, ROLL, SETCOLOR and SAVE operators.

Tokens that may have an effect on the virtual memory, stacks and the like but may also have an effect on the output file produced by the interpreter (i.e., marking operations to the page) are referred to as output tokens. Examples of output tokens for PostScript input files include the FILL, the RECTFILL, SHOW and IMAGE operators.

An interpreter may output to devices other than the page. For example, an interpreter may be configurable to operate in a plurality of output modes, at least one of which results in the generation of an output file for transfer to RIP 56 (FIG. 1). However, the interpreter may also include other output modes that produce output data for storage local to the interpreter, in a bitmap cache, for example. Accordingly, the processing of some output tokens results include marking operations that output to devices other than the page. Example of PostScript operators that change an interpreter's output state to a device other than a page include MAKEPATTERN and SETCACHEDEVICE. In addition, the processing of FORMS, PATTERNS, and TYPE 3 font characters may require marking operations to devices other than the page.

Every instance of interpreter 47 processes all interpreter environment tokens for each page in the input PDL file. In addition, each instance of interpreter 47 will only process output tokens received if the associated interpreter's output status flag is enabled or if the output state for the associated interpreter is configured for marking a device other than the page.

One type of token is an end of page token. As its name suggests, the end of page token identifies the end of the current page being processed. In a PostScript file, the end of page token is referred to as the SHOWPAGE operator. Upon receipt of an end of page token, each instance of interpreter 47 communicates to controller 49 the end of page condition. In response, controller 49 enables one of the interpreters 47 to produce the output PDL page file reference to the next page to be processed. The scheme for enabling and disabling instances of interpreter 47 is discussed in greater detail below in reference to FIG. 3b. Each instance of interpreter 47 maintains a status flag (the output state enable flag) indicative of the output enable state for the particular page being processed. As tokens are processed, the status flag is checked to determine if the operation indicated should proceed.

Referring now to FIGS. 2 and 3b, processing step 310 includes receiving a token (320), and determining if the token is an end of page token (322). If so, an end of page signal is transmitted to controller 49 (324). Upon receipt, controller 49 returns an enable or disable signal to the respective instance of interpreter 47 that transmitted the end of page signal. Controller 49 receives one end of page signal from each active instance of interpreter 47, the timing of which depends on the processing performance of each individual instance of interpreter 47.

Controller 49 may enable or disable the instances of interpreter 47 in accordance with a predefined algorithm. The predefined algorithm may be a simple round-robin scheme which alternates the enabling of different ones of the interpreters according to a predefined pattern. For example, if two instances of a interpreter are present a round-robin modulo algorithm may be implemented in which one instance may be enabled to output PDL page files for the even pages of a sheet, and the other for odd pages.

Alternatively, the instances of interpreter 47 may be enabled based on a more complex algorithm. Controller 49 may evaluate the availability of each interpreter and route page output enables to individual interpreters based on the availability determination. Instances of interpreter 47 may be executed on processors with different performance characteristics (e.g., speeds). Accordingly the availability determination may itself be a simple determination or a more complex forward looking determination process.

Instances of interpreter 47 may be configured to produce optimal results for certain types of input. For example, one instance of interpreter 47 may be executed on a processor operated at a very high speed. The "high speed" interpreter may be enabled for complex pages, while other instances of interpreter 47 may be enabled for less complex pages. Controller 49 may evaluate the characteristics of each page and enable an appropriate interpreter to perform the output production.

Upon receipt of an enable/disable signal from controller 49 (325), interpreter 47 checks to determine if the signal indicates an enable condition (output enabled)(326). If so, the interpreter sets the output state enable flag (328) and returns to step 320. If not, the interpreter resets the output state enable flag to the disable state (329) and returns to step 320.

If the token is not an end of page token, the interpreter determines if the token is a output token (330). If so, the interpreter checks to see if the output state enable flag is set (332). If it is set (enabled), the interpreter processes the token and performs the output function as indicated (334). If the flag is not set, the interpreter only invokes the interpreter environment operations required by the token (336). No output operations are invoked. Thereafter the interpreter returns to step 320.

In one embodiment of the invention, an additional check is performed after step 332 and prior to step 336 to determine the output state of the interpreter. If the output state for the interpreter is configured to mark to a device other than the page, then all output operations are invoked.

Referring now to FIGS. 2 and 4, a sample PostScript file 400 is shown. The sample PostScript file 400 may be used to draw a large gray triangle as indicated by comment fields 402 and 404 when processed by a printing device such as digital press 16. The sample PostScript file 400 is shown opposite a listing of recorder calls (generally indicated at 405) that are invoked based on the processing of the particular PostScript operators contained in sample PostScript file 400. When processing the page described by sample PostScript file 400, all instances of interpreter 47 will process the NEWPATH operator 406, the path definition 408–410, the CLOSEPATH operator 412 and the color set operator 413. The processing of these operators results in the storage of a new path and associated fill color in local memory, but do not result in any output operations.

However, the processing of the FILL operator 414 requires an output operation. Specifically, the processing of FILL operator 414 by a interpreter results in recorder calls 416–420 to be serviced by an associated recorder 204. Prior to processing the recorder calls, each instance of interpreter 47 checks its respective output state enable flag 206 to determine if the output operation (the FILL operation) should proceed. Only the particular instance of interpreter 47 that is enabled will invoke recorder 204 to perform the recorder calls 416–420. All other instances of interpreter 47 do not invoke the recorder calls.

The present invention has been described in terms of specific embodiments, which are illustrative of the invention and not to be construed as limiting. The invention may be implemented in hardware, firmware or software, or in a combination of them. Other embodiments are within the scope of the following claims.

What is claimed is:

1. A method of interpreting image data for a surface to be printed by a printing device, the method comprising:

receiving a page description language file defining at least two pages to be printed on a surface of a media sheet;

transferring the page description language file to each of a first interpreter and a second interpreter;

processing by both the first and second interpreters all interpretation language operators within the page description language file;

enabling the first interpreter to produce a first output page description file defining a first one of the pages to be printed on the surface of the media sheet while disabling the second interpreter from producing the first output page description file; and enabling the second interpreter to produce a second output page description file defining a second one of the pages to be printed on the surface of the media sheet while disabling the first interpreter from producing the second output page description file.

2. The method of claim 1 wherein the page description language file is a PostScript file.

3. The method of claim 1 wherein the output page description files are PDF files.

4. The method of claim 1 wherein the printing device is selected from the group of an imagesetter, a digital press, a printing press and a plate setter.

5. The method of claim 1, further comprising:

receiving input from at least one of the first interpreter and the second interpreter; and determining which interpreter to enable and which interpreter to disable based on the received input.

6. The method of claim 1, further comprising:

receiving an end of page token processed by at least one of the first interpreter and the second interpreter; and determining which interpreter to enable and which interpreter to disable based on the received end of page token.

* * * * *